US012736079B2

(12) United States Patent
Beyer

(10) Patent No.: US 12,736,079 B2
(45) Date of Patent: Sep. 15, 2026

(54) QUARTER TURN RETAINER

(71) Applicant: Illinois Tool Works Inc., Glenview, IL (US)

(72) Inventor: Mark A. Beyer, Armada, MI (US)

(73) Assignee: Illinois Tool Works Inc., Glenview, IL (US)

( * ) Notice: Subject to any disclaimer, the term of this patent is extended or adjusted under 35 U.S.C. 154(b) by 510 days.

(21) Appl. No.: 18/213,096

(22) Filed: Jun. 22, 2023

(65) Prior Publication Data

US 2023/0417270 A1 Dec. 28, 2023

Related U.S. Application Data

(60) Provisional application No. 63/355,723, filed on Jun. 27, 2022.

(51) Int. Cl.

*F16B 37/04* (2006.01)
*F16B 5/02* (2006.01)
*F16B 5/06* (2006.01)
*F16B 21/02* (2006.01)

(52) U.S. Cl.

CPC .......... *F16B 37/042* (2013.01); *F16B 5/0258* (2013.01); *F16B 5/0642* (2013.01); *F16B 21/02* (2013.01)

(58) Field of Classification Search

CPC ....... F16B 21/02; F16B 37/042; F16B 37/045
USPC .................................. 411/85, 349, 551, 112
See application file for complete search history.

(56) References Cited

U.S. PATENT DOCUMENTS 2,200,702 A 5/1940 Fred
2,681,679 A * 6/1954 Poupitch ............... F16B 37/042 411/113
4,007,516 A 2/1977 Coules
4,207,655 A 6/1980 MacMaster
4,580,322 A 4/1986 Wright
4,657,462 A 4/1987 Hoen
4,666,355 A * 5/1987 Stover .................. F16B 37/046 411/432
4,705,442 A 11/1987 Fucci
4,762,437 A 8/1988 Mitomi (Continued)

FOREIGN PATENT DOCUMENTS

CN 113844527 A 12/2021
DE 602004001258 T2 4/2007

(Continued)

*Primary Examiner* — Flemming Saether
(74) *Attorney, Agent, or Firm* — McAndrews, Held & Malloy, Ltd.

(57) ABSTRACT

Described is a fastener assembly to secure a first component having a first opening to a second component having a second opening via a threaded fastener. The fastener assembly may be a two-piece assemble having a first retainer and a second retainer. The first retainer includes a body portion and a sleeve extending into a recess of the body portion. The body portion includes one or more outer retaining legs resiliently coupled to a sidewall of the body portion to engage the first opening or the second opening. The second retainer includes a base and a sleeve extending from the base. The sleeve defines a threaded cavity that is sized and shaped to receive and threadedly engage the threaded fastener. The second retainer is configured to rotate within the recess about an axis of rotation from a first position to a second position.

19 Claims, 8 Drawing Sheets

(56) References Cited

Figure 1A:
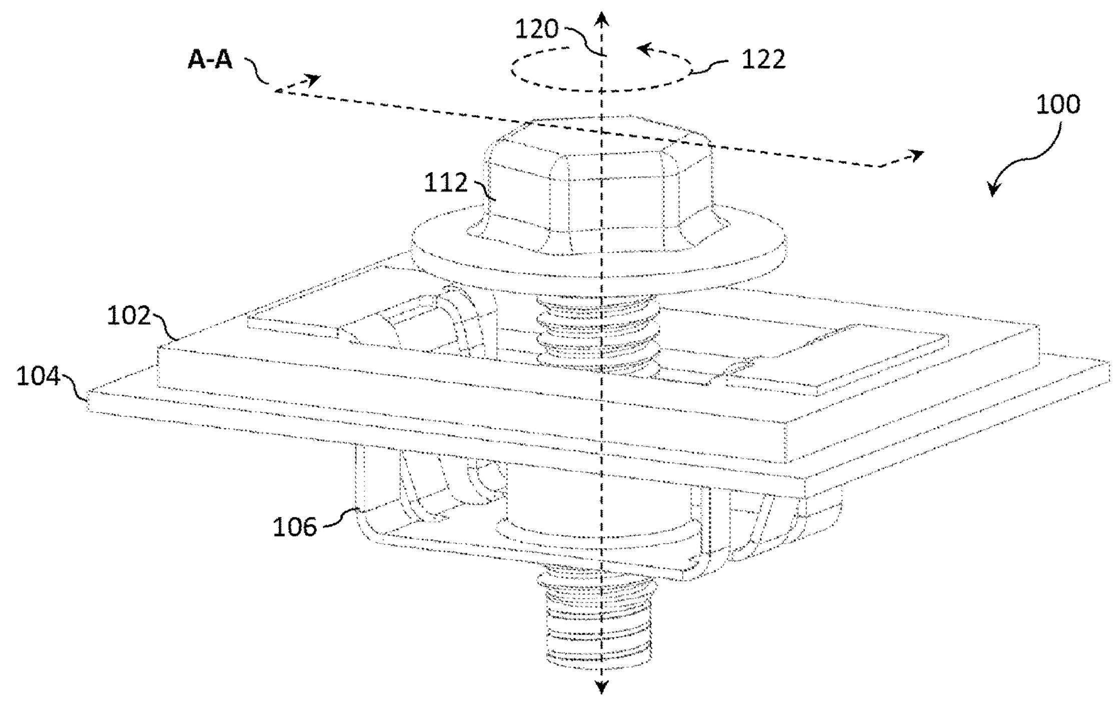

U.S. PATENT DOCUMENTS 5,011,355 A 4/1991 Motoshige
5,067,863 A * 11/1991 Kowalski .............. F16B 37/046 411/432
5,123,795 A 6/1992 Engel
5,193,961 A 3/1993 Hoyle
5,368,427 A 11/1994 Pfaffinger
5,468,109 A 11/1995 Ferrari
5,718,549 A 2/1998 Noda
6,237,970 B1 5/2001 Joannou
6,435,790 B1 8/2002 Ichikawa
6,491,333 B2 12/2002 Ichikawa
6,988,863 B2 1/2006 Hulin
7,189,112 B2 3/2007 Hamaguchi
7,798,552 B2 9/2010 Takai
8,221,041 B2 7/2012 Hauser
8,262,333 B2 9/2012 Buecker
8,444,100 B2 5/2013 Takahashi
9,121,431 B2 * 9/2015 Schraer ................. F16B 37/044
9,155,362 B2 10/2015 Shimizu
9,175,714 B2 11/2015 Tremmel
9,200,660 B2 12/2015 Tisol, Jr.
9,982,699 B2 5/2018 Risdale
10,408,252 B2 * 9/2019 Reznar .................. F16B 37/046
10,968,938 B2 4/2021 Leidig
11,041,520 B2 6/2021 Sbongk
11,661,964 B2 5/2023 Arteta
11,788,572 B2 * 10/2023 Limpert ................ F16B 37/042 29/525.02
12,196,240 B2 * 1/2025 Frisch ................... F16B 5/0233
2012/0124792 A1 5/2012 Ooki
2012/0308328 A1 * 12/2012 Ueno .................... F24S 25/636 411/134
2021/0190115 A1 6/2021 Hattori

FOREIGN PATENT DOCUMENTS

DE 102006057890 B4 5/2013
EP 1622753 B1 8/2007
EP 1958825 B1 5/2011
EP 2326847 B1 2/2012
EP 2279356 B1 2/2018
JP 4852570 B2 1/2012
KR 1033895 B1 5/2011

* cited by examiner 100
112
112a
112b
118
108
108a
108b
130
106
106a
106b
116
122
124
126
128
102
102a
102b
114
104
104a
104b
110

108a
108b
108
106a
118
106
106b 106a
116
108a
128
122
130
108b
126
118
128
124
108
106b
106
116

QUARTER TURN RETAINER

CROSS-REFERENCE

The present application claims priority to U.S. Provisional Patent Application No. 63/355,726, filed Jun. 27, 2022, and entitled "Quarter Turn Retainer" which is hereby incorporated by reference in its entirety.

BACKGROUND

Automotive components require fastening techniques that are simple to manufacture and assemble. Further, fastening techniques should be reliable and efficient. One example fastening assembly is the two-piece fastener, which can be used in various applications. In some examples, a two-piece fastener assembly employs a bolt or other threaded fastener to couple two or more components to be fastened via a pair of retainers (or the like).

Traditional two-piece fastener assemblies are sometimes limited to use with components having a more specific thickness range and/or can impart damaged on the components being fastened. For example, over-tightening the bolt could damage the components through compression, or the components could become damaged through wear over time at the contact area(s) between the fastener assembly and components to be fastened, which can be attributed to vibrations and the like.

In some examples, the two-piece fastener assembly is a quarter turn retainer, which is a form of mechanical fastening device used to secure two components via a male component and a female component. The male component typically features a protruding tab or cam, while the female component has a corresponding receptacle or slot. The tab and receptacle are designed to engage with each other when the retainer is rotated a quarter turn. While effective, the surface area at the contact between tab and receptacle can be small, which can result in a less secure connection.

In view of the foregoing, a need exists for a fastening system and/or a fastener assembly that is compatible with a larger thickness range and increases surface area at the contact between the fastener assembly and components to be fastened. In addition, a need exists for a fastening system with a fastener assembly that can be provided with the components and/or threaded fastener via one or more part-in-assembly ("PIA") to reduce assembly time by the end user.

SUMMARY

The present disclosure relates generally to a fastening assembly to form a connection between two components, such as automotive components and panels, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1*a* illustrates a perspective assembled view of an example fastener assembly having a first retainer and a second retainer in accordance with aspects of this disclosure.

Figure 1C:
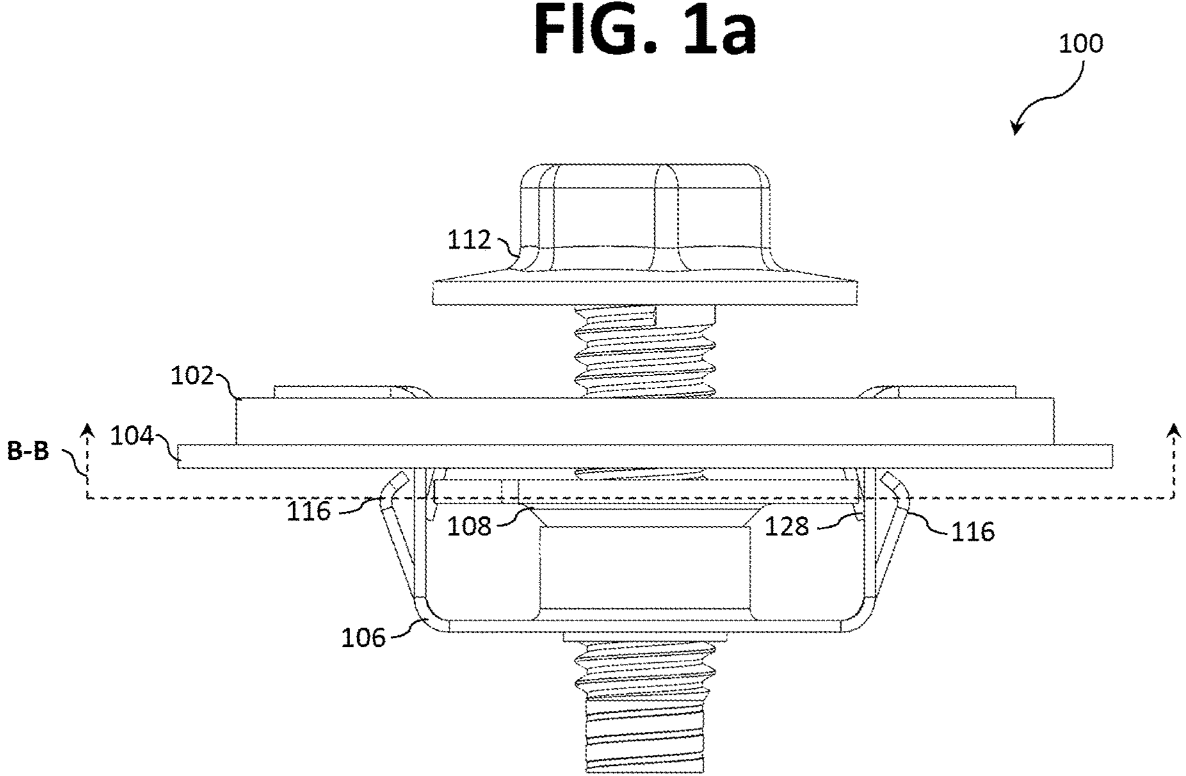
Figures 1B, 1D:
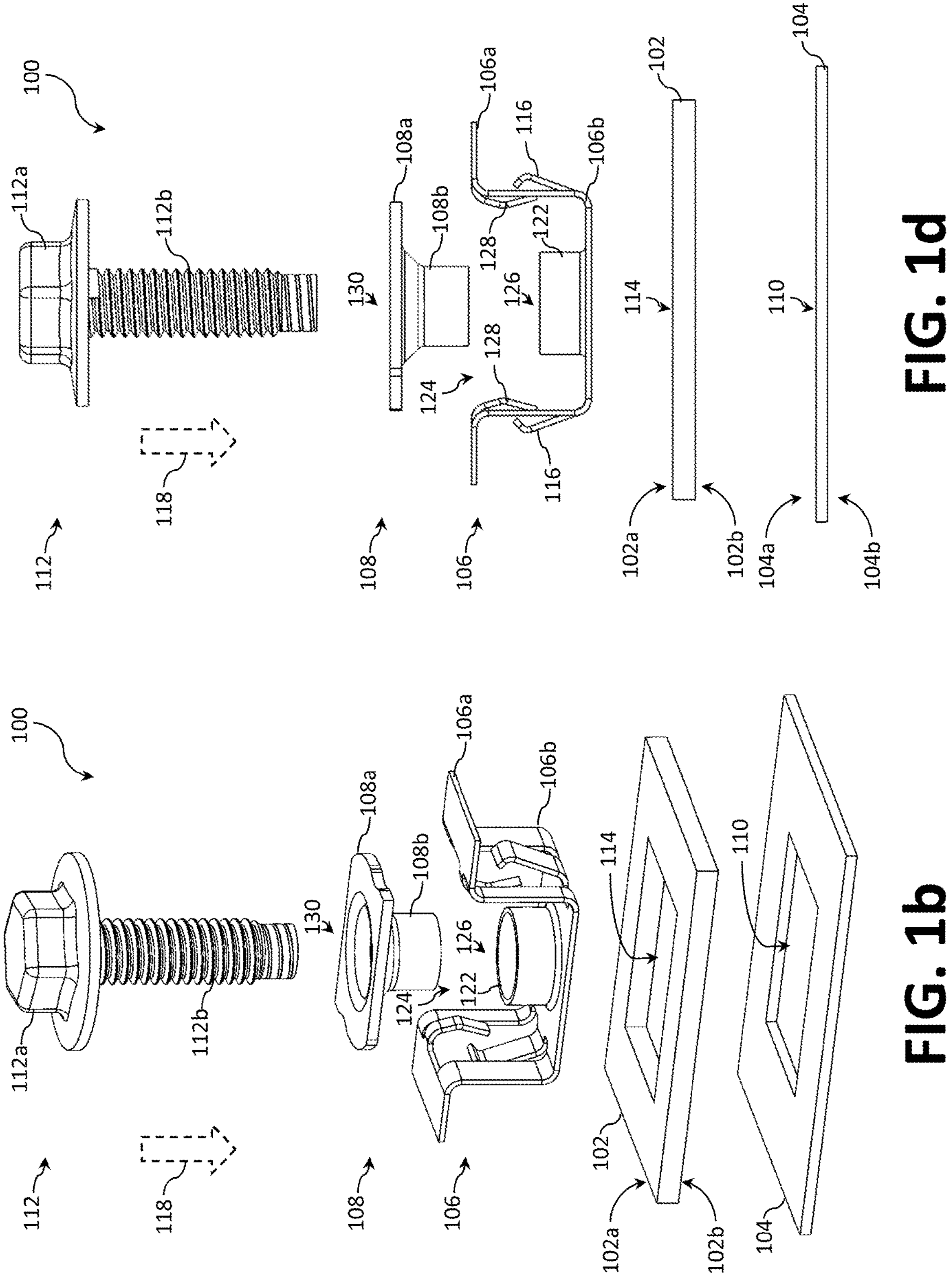

FIG. 1*b* illustrates a perspective assembly view of the example fastener assembly.

FIG. 1*c* illustrates a side assembled view of the example fastener assembly.

FIG. 1*d* illustrates a side assembly view of the example fastener assembly.

Figures 1E, 1F:
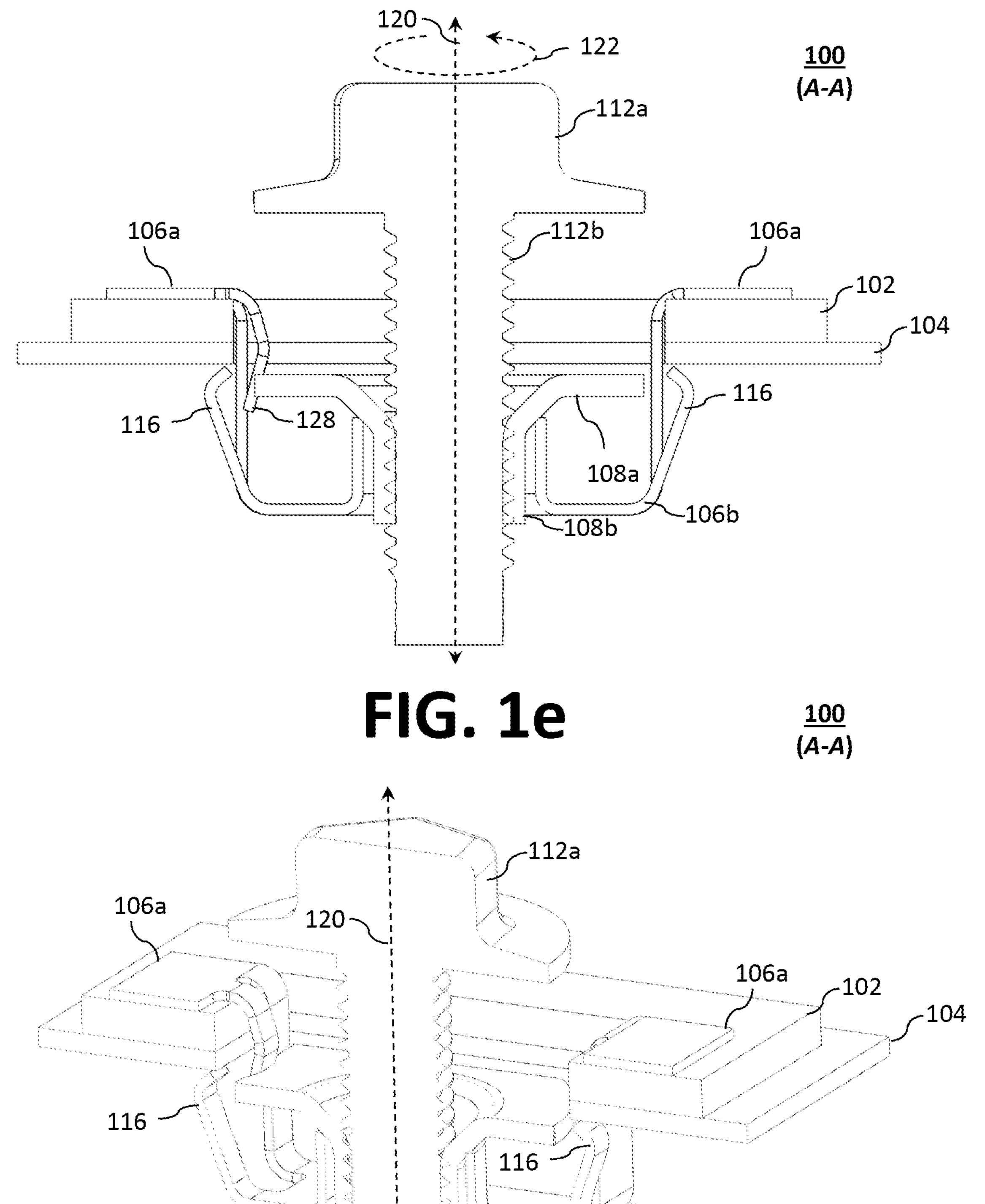

FIGS. 1*e* and 1*f* illustrate, respectively, side and perspective assembled views of the example fastener assembly taken along cutline A-A of FIG. 1*a*.

Figure 2A:
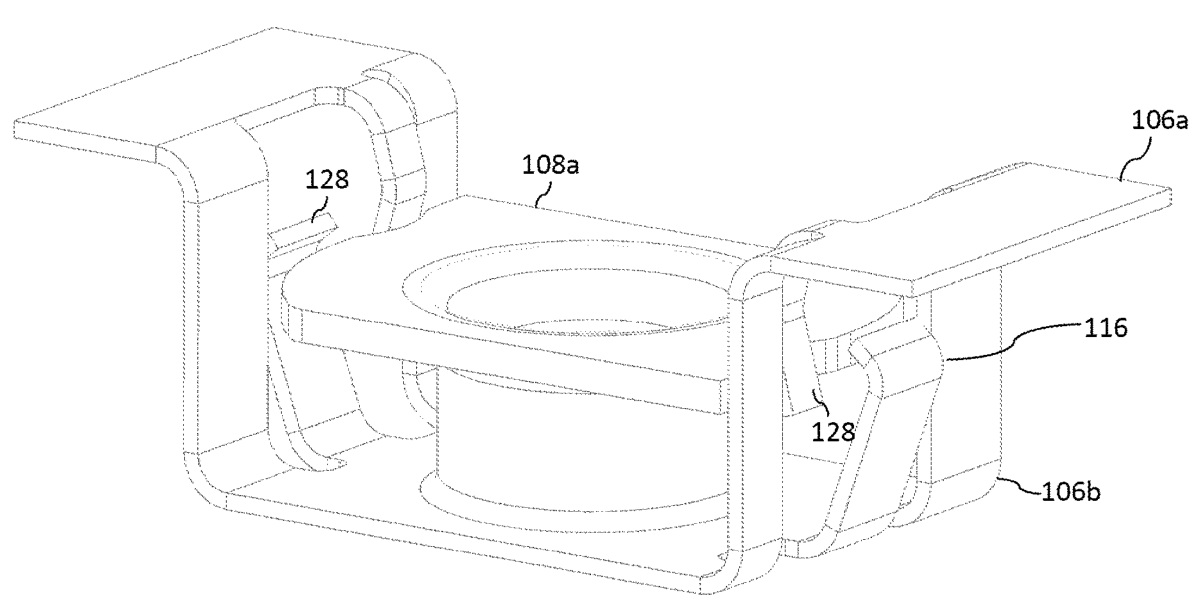
Figure 2B:
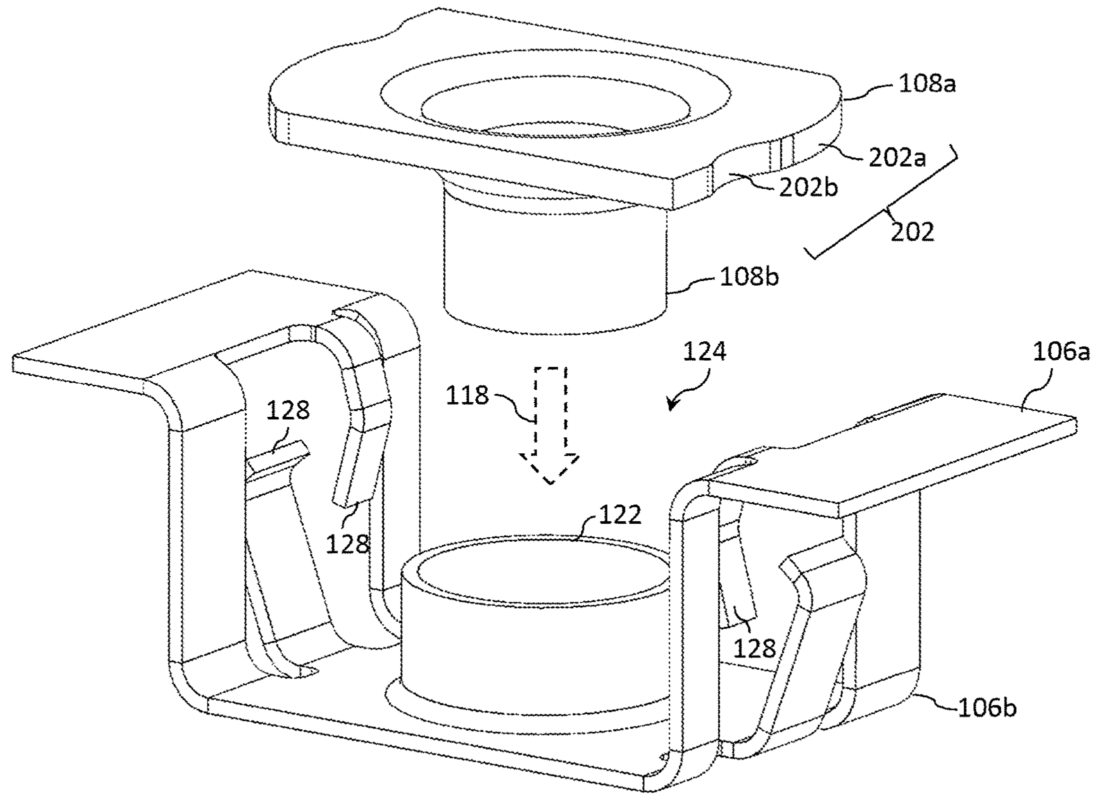

FIGS. 2*a* and 2*b* illustrate, respectively, perspective assembled and assembly views of the example fastener assembly.

Figures 2C, 2D:
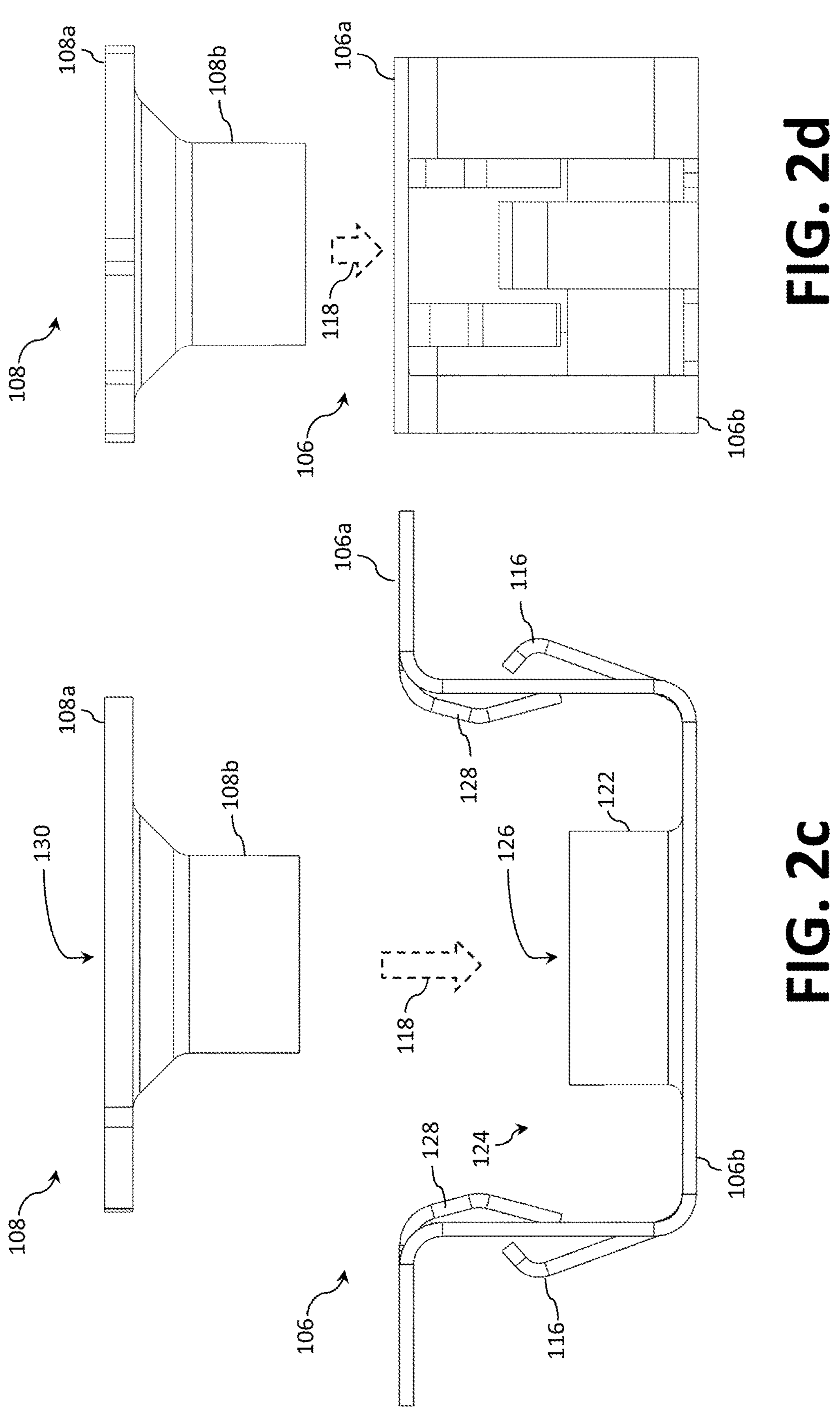

FIGS. 2*c* and 2*d* illustrate, respectively, first and second side assembly views of the example fastener assembly.

Figure 2E:
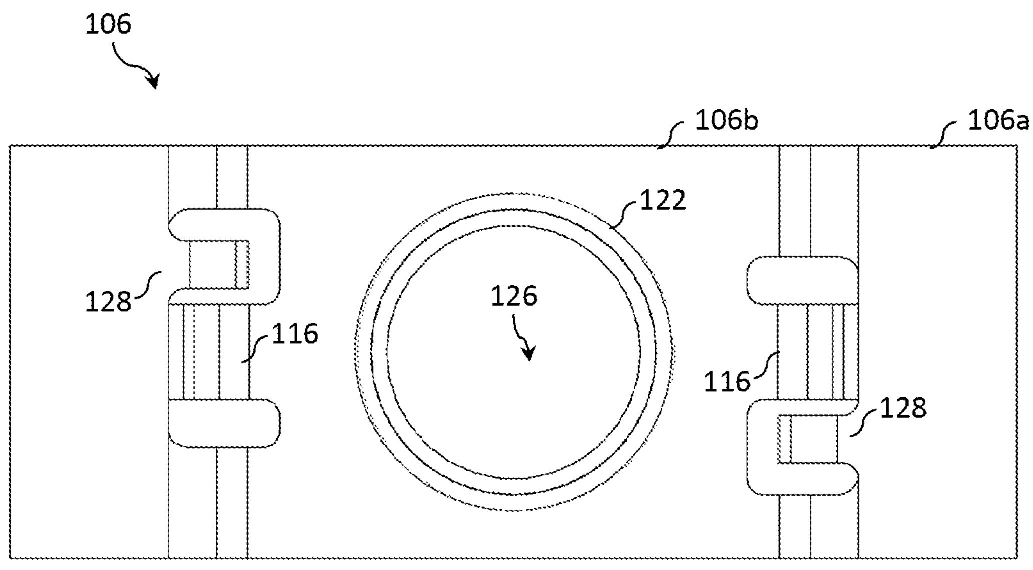
Figure 2F:
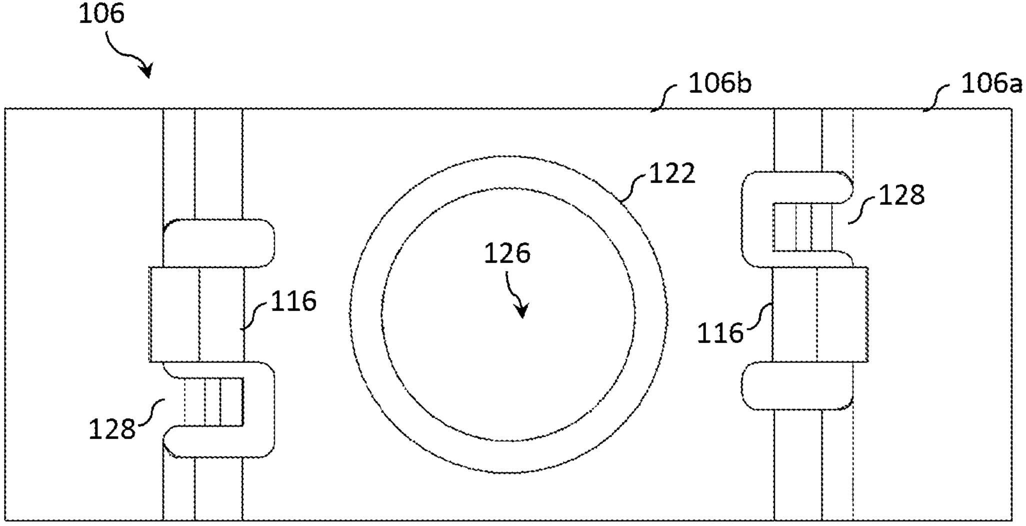

FIGS. 2*e* and 2*f* illustrate, respectively, top and bottom plan views of the first retainer.

Figure 2G:
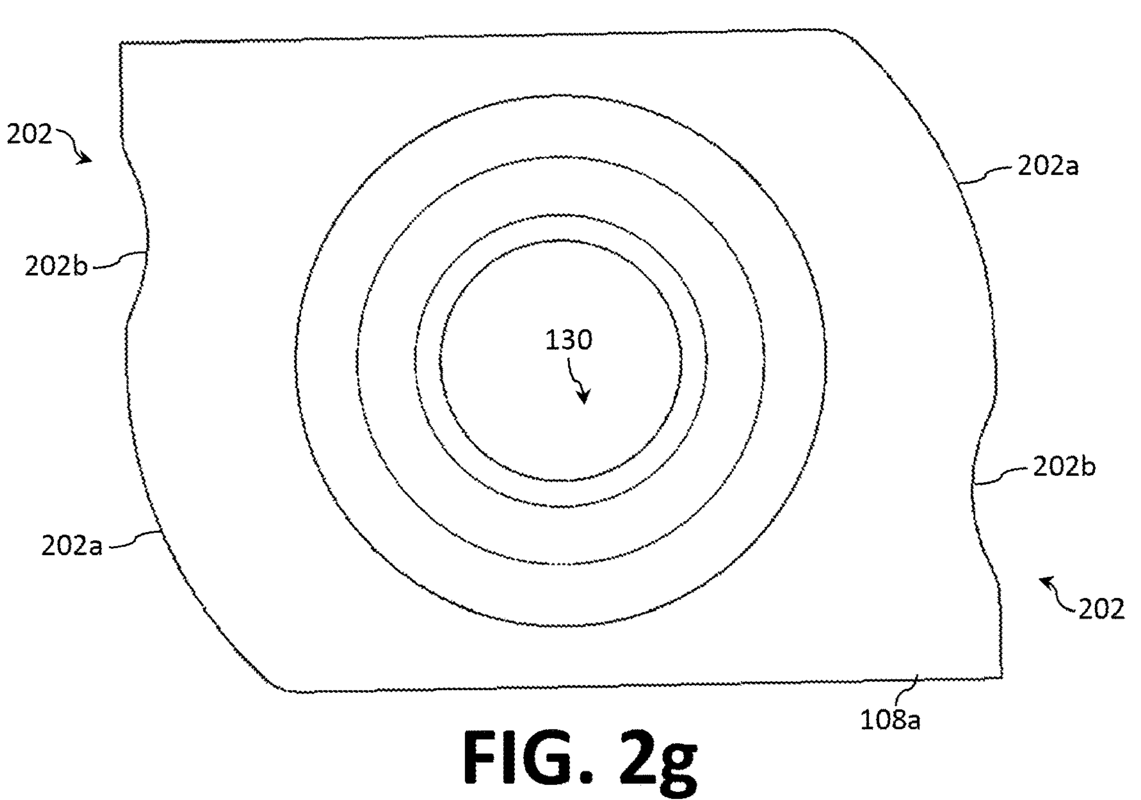
Figure 2H:
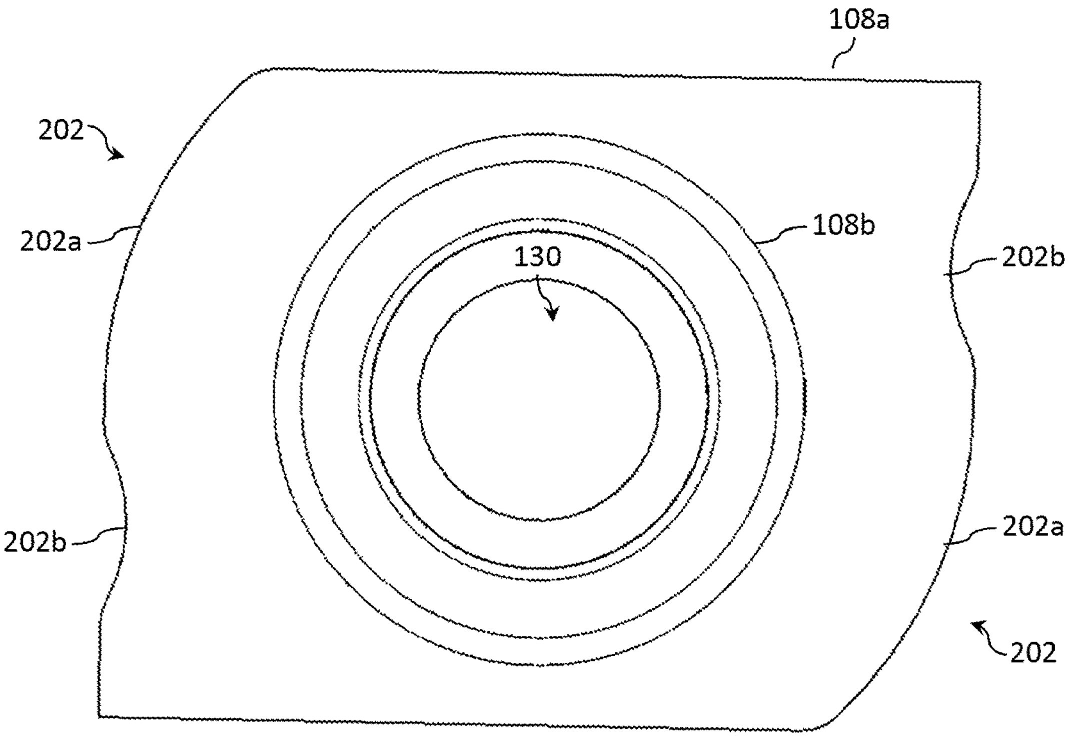

FIGS. 2*g* and 2*h* illustrate, respectively, top and bottom plan views of the second retainer.

Figure 3A:
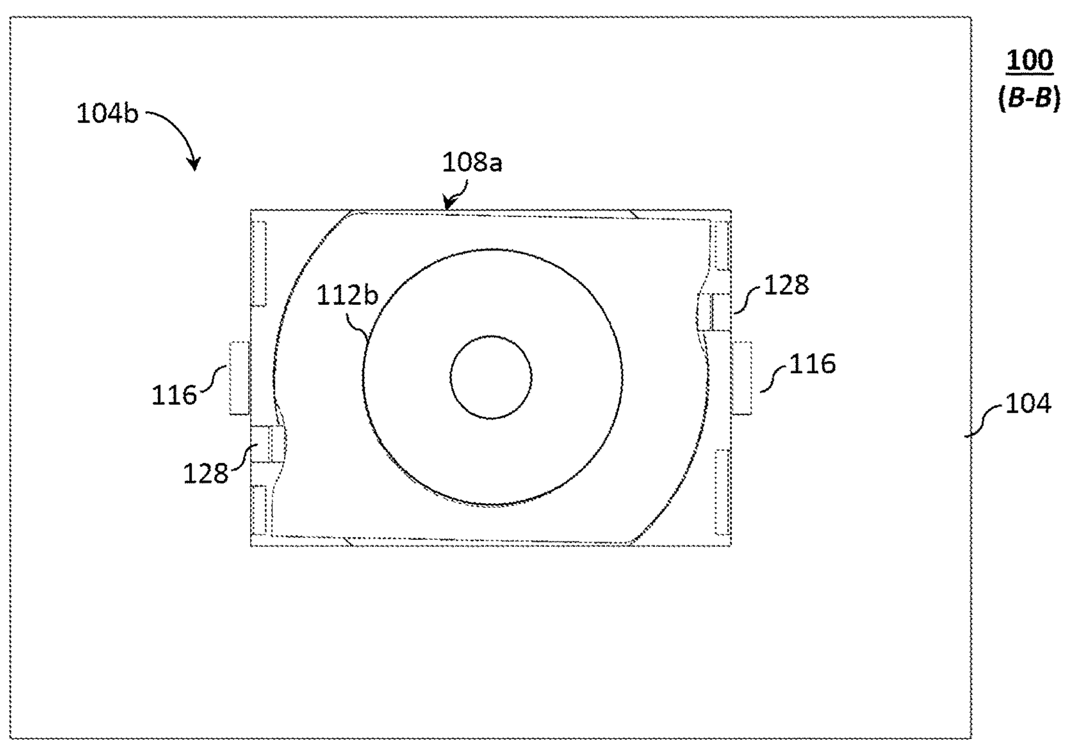
Figure 3B:
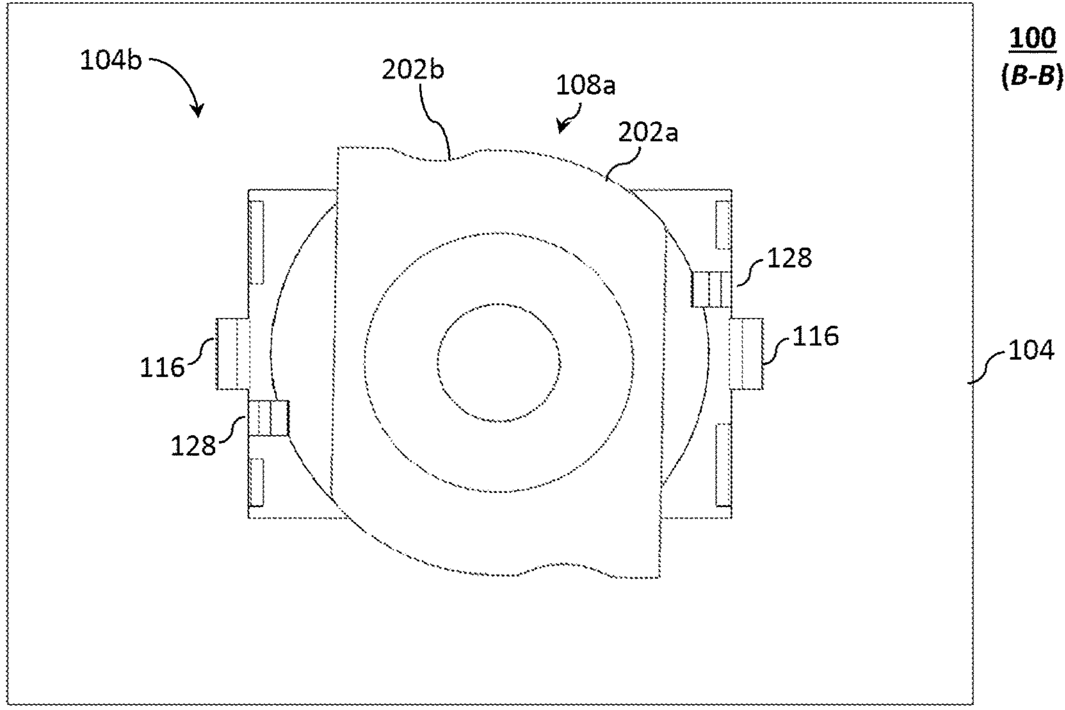

FIGS. 3*a* and 3*b* illustrate, respectively, bottom plan views of the example fastener assembly in the unfastened and fastened conditions taken along cutline B-B of FIG. 1*c*.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a fastener assembly to form a connection between a first component and a second component via a threaded fastener. The disclosed fastener assembly will be described primarily as a two-piece fastener assembly having a first retainer and a second retainer. As will be described, the first retainer and the second retainer may be secured to one another through a combination of retaining legs and a quarter turn rotation (i.e., a 90 degree rotation).

The disclosed fastener assembly allows for pre-installation of the first retainer in a first component (e.g., a secondary panel) as a part-in-assembly ("PIA") prior to shipment. Similarly, the threaded fastener can be pre-installed in the second retainer of the fastener assembly. Preinstalling one or more components offers certain benefits, such as reducing operations required on the assembly line.

In one example, a fastener assembly configured to secure a first component having a first opening to a second component having a second opening via a threaded fastener comprises: a first retainer having a body portion and a sleeve extending into a recess of the body portion, wherein the body portion comprises one or more outer retaining legs resiliently coupled to a sidewall of the body portion and configured to engage the first opening or the second opening; and a second retainer having a base and a sleeve extending from the base, wherein the sleeve defines a threaded cavity that is sized and shaped to receive and threadedly engage the threaded fastener, and wherein the second retainer is configured to rotate within the recess about an axis of rotation from a first position to a second position.

In some examples, the body portion comprises one or more inner retaining legs resiliently coupled to the sidewall of the body portion and configured to engage and retain the second retainer relative to the first retainer. In some examples, the recess defines a U-shaped side profile.

In some examples, the second retainer is rotated approximately 90 degrees about an axis of rotation to transition from the first position to the second position. The first position may be an unfastened position and second position may be a fastened position.

In some examples, when in the second position, a portion of each of the first component and the second component is sandwiched between the base and a portion of the first retainer.

In some examples, the first retainer comprises a flange portion positioned at an upper end of the body portion and configured to prevent the first retainer from passing entirely through the first opening.

In some examples, when in the second position, a portion of each of the first component and the second component is sandwiched between the base and the flange portion.

In some examples, the sleeve is generally cylindrical.

In some examples, the base defines an edge profile configured to allow the base to rotate within the recess in a first direction by a quarter turn to assume the second position.

In some examples, the edge profile is configured to allow the base to rotate within the recess in a second direction by a quarter turn to reassume the first position.

In some examples, the edge profile comprises a protruding portion and a recessed portion.

In some examples, the body portion comprises one or more inner retaining legs resiliently coupled to the sidewall of the body portion and configured to nest within the recessed portion when in the first position.

In some examples, each of the first retainer and the second retainer is a stamped-metal retainer.

In another example, a fastener assembly configured to secure a first component having a first opening to a second component having a second opening via a threaded fastener comprises: a first stamped-metal retainer having a body portion defining a recess, wherein the body portion comprises one or more outer retaining legs resiliently coupled to a sidewall of the body portion and configured to engage the first opening or the second opening; and a second stamped-metal retainer configured to receive the threaded fastener and to rotate within the recess, wherein the second stamped-metal retainer includes a base that defines an edge profile configured to allow the base to rotate within the recess in a first direction by a quarter turn to transition from an unfastened position to a fastened position. The second stamped-metal retainer can be configured to receive the threaded fastener via a sleeve that defines a threaded cavity. The sleeve is fixed relative to the base and/or unitary.

In yet another example, a fastening system configured to secure a first component having a first opening to a second component having a second opening comprises: a threaded fastener; a first stamped-metal retainer having a body portion defining a recess, wherein the body portion comprises one or more outer retaining legs resiliently coupled to a sidewall of the body portion and configured to engage the first opening or the second opening, and wherein the body portion comprises one or more inner retaining legs resiliently coupled to the sidewall of the body portion; and a second stamped-metal retainer configured to rotate within the recess and to receive the threaded fastener via a sleeve that defines a threaded cavity, wherein the second stamped-metal retainer includes a base that defines an edge profile configured to allow the base to rotate within the recess in a first direction by a quarter turn to transition from an unfastened position to a fastened position, and wherein the second stamped-metal retainer is secured relative to the first stamped-metal retainer via the one or more inner retaining legs. The second stamped-metal retainer can be rotated about 90 degrees about an axis of rotation to transition from the unfastened position to the fastened position. The first stamped-metal retainer can further comprise a flange portion positioned at an upper end of the body portion and configured to prevent the first stamped-metal retainer from passing entirely through the first opening.

FIG. 1*a* illustrates a perspective assembled view of an example fastener assembly 100 configured to join a first component 102 and a second component 104 in accordance with aspects of this disclosure, while FIG. 1*b* illustrates a perspective assembly view of the example fastener assembly 100. The illustrated fastener assembly 100 includes a first retainer 106 and a second retainer 108. FIGS. 1*c* and 1*d* illustrate, respectively, side assembled and assembly views of the example fastener assembly 100. FIGS. 1*e* and 1*f* illustrate side and perspective assembled views of the example fastener assembly taken along cutline A-A of FIG. 1*a*.

As illustrated, the fastener assembly 100 generally comprises a first retainer 106 and a second retainer 108 to form a connection between the first component 102 and the second component 104 via a threaded fastener 112. In operation, the second retainer 108 is configured to rotate about a quarter turn (i.e., 90 degrees) about an axis of rotation 120 to transition between a first position (e.g., unfastened position/unsecured position) to a second position (e.g., fastened position/secured position).

The illustrated threaded fastener 112 comprises a shaft 112*b* and a head portion 112*a*. The head portion 112*a* includes an engagement feature formed therein or thereon. In the illustrated example, the engagement feature is illustrated as a hex-shaped head (e.g., to engage a socket wrench), but other shapes and configurations are contemplated, such as a linear slot, a Phillips-style slot, square, star, or the like.

The first retainer 106 and the second retainer 108 can be made from various materials, including plastics, metals, or a combination of both, depending on the specific application requirements. One or both of the first retainer 106 and the second retainer 108 can be fabricated from, for example, sheet metal via a metal stamping process. For example, a flat blank can be stamped from a sheet of metal and then bent to form a stamped-metal retainer, such as a stamped-metal first retainer 106 and a stamped-metal second retainer 108. Further, one or more features may be added to the first retainer 106 and the second retainer 108 through a deep drawing process, which is a manufacturing technique used to transform a flat sheet metal blank into three-dimensional shapes. For example, the flat sheet metal blank can be radially drawn into a forming die by the mechanical action of a punch to form, for example, cylindrical shapes.

Depending on the application, the first component 102 and the second component 104 may be fabricated to from, for example, metal (or a metal alloy), synthetic or semi-synthetic polymers (e.g., plastics, such as acrylonitrile butadiene styrene ("ABS") and polyvinyl chloride ("PVC"), etc.), composite materials (e.g., fiber glass), or a combination thereof. In one example, the first component 102 is an automotive secondary panel and the second component 104 is an automotive primary panel.

The first component 102 may define an A-surface 102*a* and a B-surface 102*b* (illustrated as an undersurface). The A-surface 102*a*, also called a class A surface, is typically the surface that is visible after assembly and, for that reason, is more aesthetically pleasing (e.g., includes a logo, texture, coating, or other decorations) and typically is free of attachment devices and/or related features. Conversely, the B-surface 102*b*, also called a class B surface, is typically the surface that is not visible after assembly. The second component 104 may likewise define an A-surface 104*a* and a B-surface 104*b* (illustrated as an undersurface).

In the automotive industry, example first components 102 include, without limitation, jack covers, trailer hitch cover, door trim panels, moldings, trim pieces, and other substrates (whether use on the interior and exterior surfaces). The second component 104 may be, for example, a structural component of a vehicle, such as doors, pillars (e.g., an A-pillar, B-Pillar, C-Pillar, etc.), dashboard components (e.g., a cross member, bracket, frame, etc.), seat frames, center consoles, fenders, sheet metal framework, or the like.

The first component 102 includes, defines, or otherwise provides a first opening 114, while the second component 104 includes, defines, or otherwise provides a second opening 110. In one example, a leading end of the body portion 106*b* of the first retainer 106 is inserted into and through the first opening 114 formed in or on a surface of the first component 102 in the direction indicated by arrow 118. Each of the first opening 114 and the second opening 110 is illustrated as a rectangular opening (e.g., a window) that corresponds to the size and shape of the first retainer 106 to receive the first retainer 106, however other shapes (e.g., circles, stars, triangles, quadrangles, and other polygons) are contemplated based on the size, shape, and dimensions of the first retainer 106.

As will be described, the first retainer 106 includes one or more outer retaining legs 116 resiliently coupled to and extending outwardly from a sidewall of the body portion 106*b*. The one or more outer retaining legs 116 are configured to initially engage the first component 102 via the first opening 114 (e.g., via the perimeter), but during final assembly the one or more outer retaining legs 116 can also engage the second component 104 via the second opening 110 (e.g., via the perimeter). Thus, as best illustrated in the cross-sectional views of FIGS. 1*e* and 1*f*, the one or more outer retaining legs 116 are configured to retain both the first component 102 and the second component 104 between the one or more outer retaining legs 116 and underside of the flange portion 106*a*.

FIGS. 2*a* and 2*b* illustrate, respectively, perspective assembled and assembly views of the example fastener assembly 100, while FIGS. 2*c* and 2*d* illustrate, respectively, first and second side assembly views of the example fastener assembly 100. FIGS. 2*e* and 2*f* illustrate, respectively, top and bottom plan views of the first retainer, while FIGS. 2*g* and 2*h* illustrate, respectively, top and bottom plan views of the second retainer. In each of the views of FIGS. 2*a* through 2*h*, the first component 102, the second component 104, and the threaded fastener 112 are omitted to better illustrate the features of the fastener assembly 100.

The first retainer 106 includes a flange portion 106*a*, a body portion 106*b*, and a sleeve 122. In the illustrated example, the second retainer 108 is stamped, drawn, and/or tapped to define the flange portion 106*a*, the body portion 106*b*, and the sleeve 122. The flange portion 106*a*, the body portion 106*b*, and/or the sleeve 122 may be fixed relative to one another and/or a unitary structure fabricated via, for example, a stamping and/or deep drawing process. The flange portion 106*a* is positioned at an upper end of the body portion 106*b* and extends outwardly from the body portion 106*b* to prevent the first retainer 106 from passing entirely through the first opening 114 of the first component 102 upon insertion of the body portion 106*b*. In some examples, the flange portion 106*a* may be shaped as a spring and configured to absorb movement once assembled, while also increasing manufacturing tolerances.

The body portion 106*b* defines a recess 124. In the illustrated example, the body portion 106*b* is illustrated as generally rectangular (e.g., a rectangular prism) and defining a generally rectangular recess 124 with a generally U-shaped side profile (as illustrated in FIG. 2*c*, for example), though other shapes are contemplated, including, for example, triangular, square, cylindrical, and other polygonal shapes. Accordingly, the first retainer 106 may be fabricated in various sizes and shapes depending on, for example, the installation application, the shape of the second retainer 108, etc.

The sleeve 122, which is illustrated as generally cylindrical, is coupled to and extends inwardly into the recess 124 from the body portion 106*b*. The sleeve 122 can be formed through a deep drawing process. The sleeve 122 serves to guide the second component 108 during shipment and/or handling, as well as aligning a corresponding sleeve 108*b* of the second component 108 during rotation of the threaded fastener 112. To that end, the sleeve 122 is sized and shaped to receive the sleeve 108*b* within a cavity 126 formed therein. In this example, the cavity 126 is smooth (e.g., unthreaded) to allow linear insertion of the sleeve 108*b* (in the direction indicated by arrow 118).

The body portion 106*b* includes one or more outer retaining legs 116 and one or more inner retaining legs 128 resiliently coupled to a sidewall of the body portion 106*b*. In the illustrated example, an outer retaining leg 116 and an inner retaining leg 128 are provided on opposed sidewalls such that an outer retaining leg 116 and an inner retaining legs 128 are provided on each side of the body portion 106*b*. In the illustrated example, the body portion 106*b* comprises two outer retaining legs 116—each arranged on opposite sides of the body portion 106*b*. While two outer retaining legs 116 are illustrated, additional or fewer outer retaining legs 116 may be employed depending on the size of the first retainer 106.

As best illustrated in FIGS. 1*e* and 1*f*, the one or more outer retaining legs 116 extend outwardly from the axis of rotation 120 and are configured to engage the first component 102 and/or second component 104, whereas the one or more inner retaining legs 128 extend inwardly toward the axis of rotation 120 (i.e., into the recess 124) and are configured to secure the second retainer 108 relative to the first retainer 106. In the illustrated example, the inner retaining legs 128 are configured to secure the second retainer 108 within the recess 124 of the body portion 106*b*. The one or more outer retaining legs 116 are configured to retain the second component 104 (e.g., clipping or snapping the second component 104 between the one or more outer retaining legs 116 and underside of the flange portion 106*a*).

In some examples, the first retainer 106 can be preinstalled in the first component 102 as a PIA prior to shipment. That is, the outer retaining legs 116 on the outer side of the first retainer 106 are configured to secure the assembly in the first component 102, for example, for shipment from a tier supplier into a final assembly plant.

In the illustrated example, the second retainer 108 is stamped, drawn, and/or tapped to define a base 108*a* and a sleeve 108*b*. The sleeve 108*b* is coupled to and extends away from the base 108*a*. The base 108*a* and the sleeve 108*b* may be fixed relative to one another and/or a unitary structure fabricated via, for example, a deep drawing process. For example, the sleeve 108*b* is generally perpendicular to the base 108*a*. The sleeve 108*b* defines a threaded cavity 130 that is sized and shaped to receive and threadedly engage the shaft 112*b* of the threaded fastener 112. To that end, the inner wall of the threaded cavity 130 comprises one or more threads configured to engage corresponding threads on the outer surface of the shaft 112*b* of the threaded fastener 112. In some examples, the second retainer 108 may include a preinstalled threaded fastener 112 as a PIA (e.g., as a threaded PIA). That is, the threaded fastener 112 can be threaded into the threaded cavity 130 of the sleeve 108*b* during final assembly or to form a PIA.

The base 108*a*, which is illustrated as a generally rectangular-shaped base, is further shaped on its opposed ends to form an edge profile 202. For example, the edge profile 202 can be shaped to allow the base 108*a* to rotate within the recess 124 by a quarter turn to assume a fastened position during tightening of the threaded fastener 112 in a first direction. To that end, each edge profile 202 includes a protruding portion 202*a* and a recessed portion 202*b*. For example, as illustrated, the protruding portion 202*a* can be a generally rounded convex portion, while the recessed portion 202*b* is a generally rounded concave portion or "notch."

In addition, the edge profile 202 enables the base 108*a* to return to the unfastened position (i.e., without overshooting the position to, in effect, reassume the fastened position) during loosening of the threaded fastener 112 in a second direction that is opposite the first direction. For example, during loosening of the threaded fastener 112, the protruding portion 202*a* would abut a portion of the body portion 106*b* to prevent further rotation of the base 108*a* to maintain an unfastened position. This enables the threaded fastener 112 to be removed from the second retainer 108, thus allowing the fastener assembly 100 to be easily serviced or replaced.

When assembled, the inner retaining legs 128 nest or otherwise reside within the recessed portion 202*b* of the base 108*a* of the second retainer 108 when in the unfastened position. The engagement between the inner retaining legs 128 and the recessed portion 202*b* serves to prevent or mitigate risk of the second retainer 108 from rotating out of position during shipment. That is, the recessed portions 202*b* work in concert with the inner retaining legs 128 to correctly orient the second retainer 108 and for retention during shipping.

The size and shape of the base 108*a* further increase the surface area at the contact area(s) between the fastener assembly 100 and components to be fastened (e.g., the first component 102 and second component 104) when in the fastened position. Therefore, the fastener assembly 100 not only provides for a secure fixation to the first component 102 and the second component 104, but the fastener assembly 100 also mitigates damage to the second component 104 by distributing the compression force from the threaded fastener 112 over a larger surface area on the component.

In the illustrated example, the first retainer 106 and the second retainer 108 are configured to float up and down in a direction parallel to the direction indicated by arrow 118. The vertical float allows the second retainer 108 to move vertically and securely contact the B-surface 104*b* of the second component 104. This allows the fastener assembly 100 to be used in larger thickness ranges to enable the fastener assembly 100 to accommodate a varying thickness. The disclosed fastener assembly 100 accommodate a wider range of panel thicknesses and mitigates damage to one or both of the first component 102 and the second component 104 during under high load conditions.

The fastener assembly 100 can be assembled during multiple steps of stages depending on assembly requirements and location. In some examples, one or more components thereof can be preassembled in one location to form a PIA and shipped to a second location to be assemble with another component of even a second PIA. In some examples, the first retainer 106 can be inserted into the first opening 114 at a first location to define the PIA, a clip PIA, while the threaded fastener 112 can be inserted into the threaded cavity 130 at a second location to define another PIA, a threaded PIA. The clip PIA and the threaded PIA could then be coupled together at a third location. For example, the threaded PIA can be coupled to the clip PIA by inserting the sleeve 108*b* into the cavity 126 in the direction indicated by arrow 118. In some examples, the one or more inner retaining legs 128 can be used to secure (e.g., snap or clip) the threaded PIA relative to the clip PIA through an interference fit prior to tightening the threaded fastener 112.

FIGS. 3*a* and 3*b* illustrate, respectively, bottom plan views of the example fastener assembly 100 in an unfastened position (prior to rotation of the second component 108) and a fastened position (a quarter turn rotation of the second component 108) taken along cutline B-B of FIG. 1*c*.

During assembly, rotation of the threaded fastener 112 causes the second component 108 to rotate to engage the first component 102 and/or second component 104 to position material (e.g., a portion of the base 108*a*) behind the first component 102, allowing for rigid and secure fixation. For example, once the assembly fastener assembly 100 is inserted into second opening 110, the threaded fastener 112 can be rotated about the axis of rotation 120 to threadedly engage and draw the second retainer 108 along the shaft 112*b* toward the head portion 112*a*.

In addition to allowing for the threaded fastener 112 to be preinstalled in the second component 108 and mitigating risk of the threaded fastener 112 falling out during shipment, prevailing torque in the sleeve 108*b* causes the second component 108 to rotate with the turning of the threaded fastener 112 during final installation. For example, by a quarter turn, which can be dictated by a shape of the edge profile 202. As best illustrated in FIG. 3*b*, the second retainer 108 rotates by a quarter turn (i.e., 90 degrees) relative to the first retainer 108 during the quarter turn rotation to ultimately sandwich and compress both the first component 102 and the second component 104 between the base 108*a* of the second retainer 108 and an underside of the flange portion 106*a*.

Once assembled and the threaded fastener 112 is tightened, the first component 102 and the second component 104 are securely held in place via a compression force between the base 108*a* of the second retainer 108 and underside of the flange portion 106*a*—creating a firm and stable connection. That is, a quarter turn rotation of the base 108*a* (via the threaded fastener 112, for example) positions at least a portion of the base 108*a* behind the first component 102 such that the first component 102 and the second component 104 are sandwiched between the base 108*a* and the flange portion 106*a*. Rotation of the base 108*a* increases surface area at the contact area between the base 108*a* and the second component 104 to mitigate damage by distributing force over a larger surface area on the second component 104 during compression by the threaded fastener 112. While a 90-degree rotation is primarily described, other degrees or rotation may be used depending on, for example, the size and shape of 108*a* and/or second opening 110.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A fastener assembly configured to secure a first component having a first opening to a second component having a second opening via a threaded fastener, the fastener assembly comprising:

a first retainer having a body portion and a first sleeve extending into a recess of the body portion, wherein the body portion comprises one or more outer retaining legs resiliently coupled to a sidewall of the body portion and configured to engage the first opening or the second opening; and a second retainer having a base and a second sleeve extending from the base, wherein the second sleeve defines a threaded cavity that is sized and shaped to receive and threadedly engage the threaded fastener, and wherein the second retainer is configured to rotate within the recess about an axis of rotation from a first position to a second position, wherein the first sleeve is configured to receive the second sleeve.

2. The fastener assembly of claim 1, wherein the body portion comprises one or more inner retaining legs resiliently coupled to the sidewall of the body portion and configured to engage and retain the second retainer relative to the first retainer.

3. The fastener assembly of claim 1, wherein the recess defines a U-shaped side profile.

4. The fastener assembly of claim 1, wherein the second retainer is rotated approximately 90 degrees about the axis of rotation to transition from the first position to the second position.

5. The fastener assembly of claim 1, wherein the second position is a fastened position.

6. The fastener assembly of claim 1, wherein, when in the second position, a portion of each of the first component and the second component is sandwiched between the base and a portion of the first retainer.

7. The fastener assembly of claim 1, wherein the first retainer comprises a flange portion positioned at an upper end of the body portion and configured to prevent the first retainer from passing entirely through the first opening.

8. The fastener assembly of claim 7, wherein, when in the second position, a portion of each of the first component and the second component is sandwiched between the base and the flange portion.

9. The fastener assembly of claim 1, wherein the second sleeve is generally cylindrical.

10. The fastener assembly of claim 1, wherein the base defines an edge profile configured to allow the base to rotate within the recess in a first direction by a quarter turn to assume the second position.

11. The fastener assembly of claim 10, wherein the edge profile is configured to allow the base to rotate within the recess in a second direction by a quarter turn to reassume the first position.

12. The fastener assembly of claim 10, wherein the edge profile comprises a protruding portion and a recessed portion.

13. The fastener assembly of claim 12, wherein the body portion comprises one or more inner retaining legs resiliently coupled to the sidewall of the body portion and configured to nest within the recessed portion when in the first position.

14. The fastener assembly of claim 1, wherein each of the first retainer and the second retainer is a stamped-metal retainer.

15. A fastener assembly configured to secure a first component having a first opening to a second component having a second opening via a threaded fastener, the fastener assembly comprising:

a first stamped-metal retainer having a body portion defining a recess and a first sleeve, wherein the first sleeve extends into the recess, wherein the body portion comprises one or more outer retaining legs resiliently coupled to a sidewall of the body portion and configured to engage the first opening or the second opening; and a second stamped-metal retainer having a second sleeve, the second sleeve defining a threaded cavity and being sized and shaped to threadedly engage the threaded fastener, wherein the second stamped-metal retainer includes a base that defines an edge profile configured to allow the base to rotate within the recess in a first direction by a quarter turn to transition from an unfastened position to a fastened position, wherein the edge profile comprises a curved edge profile, wherein the first sleeve is configured to receive the second sleeve.

16. The fastener assembly of claim 15, wherein the second sleeve is fixed relative to the base.

17. A fastening system configured to secure a first component having a first opening to a second component having a second opening, the fastening system comprising:

a threaded fastener;

a first stamped-metal retainer having a body portion defining a recess, and a first sleeve extending into the recess, wherein the body portion comprises one or more outer retaining legs resiliently coupled to a sidewall of the body portion and configured to engage the first opening or the second opening, and wherein the body portion comprises one or more inner retaining legs resiliently coupled to the sidewall of the body portion; and a second stamped-metal retainer configured to rotate within the recess and to receive the threaded fastener via a second sleeve that defines a threaded cavity, wherein the second stamped-metal retainer includes a base that defines an edge profile configured to allow the base to rotate within the recess in a first direction by a quarter turn to transition from an unfastened position to a fastened position, wherein the edge profile comprises a curved edge profile, wherein the second stamped-metal retainer is secured relative to the first stamped-metal retainer via the one or more inner retaining legs, and wherein the first sleeve is configured to receive the second sleeve.

18. The fastening system of claim 17, wherein the second stamped-metal retainer is rotated about 90 degrees about an axis of rotation to transition from the unfastened position to the fastened position.

19. The fastening system of claim 17, wherein the first stamped-metal retainer comprises a flange portion positioned at an upper end of the body portion and configured to prevent the first stamped-metal retainer from passing entirely through the first opening.

* * * * *